(12) United States Patent
Lee et al.

(10) Patent No.: US 9,694,402 B1
(45) Date of Patent: Jul. 4, 2017

(54) CLEANING METHOD OF CONTAMINATED SOILS

(71) Applicant: JIU CORPORATION, Seoul (KR)

(72) Inventors: Seung Woo Lee, Seoul (KR); Jae Won Lee, Seoul (KR)

(73) Assignee: JIU Corporation, Seoul (KR)

( * ) Notice: Subject to any disclaimer, the term of this patent is extended or adjusted under 35 U.S.C. 154(b) by 0 days.

(21) Appl. No.: 14/967,117

(22) Filed: Dec. 11, 2015

(51) Int. Cl.
  *B09C 1/08* (2006.01)
  *B09C 1/02* (2006.01)
  *B02C 17/00* (2006.01)
  *B03D 1/24* (2006.01)

(52) U.S. Cl.
  CPC .............. *B09C 1/08* (2013.01); *B02C 17/00* (2013.01); *B03D 1/24* (2013.01); *B09C 1/02* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,599,137 A * | 2/1997 | Stephenson | ............. | B03B 5/623 405/128.75 |
| 5,837,210 A * | 11/1998 | Simmons | ................. | B03D 1/00 209/166 |
| 5,897,772 A * | 4/1999 | Chiang | ................. | B01D 17/00 209/170 |

OTHER PUBLICATIONS

Cebeci, Y. et al., "Effect of Flotation Reagents on the Wet Grinding of Celestite Concantrate," Indian Journal of Chemical Technology, May 2004, pp. 382-387, vol. 11.

* cited by examiner

*Primary Examiner* — Kyle Armstrong
(74) *Attorney, Agent, or Firm* — Fenwick & West LLP

(57) ABSTRACT

The present disclosure relates to a method for cleaning contaminated soil including a process which grinds contaminated soil to separate contaminants present on the surface of the contaminated soil from the soil, and a process which injects air into a mixture of water and contaminated soil having undergone the surface grinding process to generate air bubbles and removes only the generated air bubbles to remove the contaminants included in the air bubbles.

2 Claims, 9 Drawing Sheets

CLEANING METHOD OF CONTAMINATED SOILS

BACKGROUND

1. Field

The present disclosure relates to a method for cleaning soil contaminated with heavy metals or other hazardous substances.

2. Description of the Related Art

In case where soil is contaminated with heavy metals, the contamination situation cannot be easily perceived by odors or by the naked eye. Thus, soil contaminated with heavy metals is more difficult to recognize its contamination situation than soil contaminated with oils. However, because soil contamination by heavy metals greatly threatens human health for a long time, cleanup of soil contaminated with heavy metals is needed.

There are conventional methods for removing contaminants such as heavy metals from soil in which surfactants, acidic solutions, or alkali solutions are mixed with soil to separate contaminants from the soil, and the contaminants are introduced into an aqueous solution and then removed from the soil. However, in the case of contaminated fine soil having a very small soil particle size, according to the prior art, a large amount of chemicals and facility costs is required to clean the soil, resulting in low economical efficiency and it is difficult to practically apply, so the prior art is unsuitable for fine soil contaminated with heavy metals.

SUMMARY

The present disclosure is directed to providing contaminated soil cleaning technology for efficiently removing contaminants such as heavy metals from contaminated soil.

To achieve the above objective, the present disclosure provides a method for cleaning contaminated soil, including a surface grinding process which grinds contaminated soil in a mixed state with water through a grinding machine to separate contaminants present on the surface of the contaminated soil from the soil, and a floatation separation process which injects air into the mixture of water and contaminated soil having undergone the surface grinding process to generate air bubbles, and removes only the generated air bubbles to remove the contaminants included in the air bubbles.

In the present disclosure such as the above, the floatation separation process may add potassium amyl xanthate or sodium dodecyl sulfate as a collector to the mixture of water and contaminated soil having undergone the surface grinding process, and inject air into the mixture of water and contaminated soil containing the added collector to generate air bubbles, and the surface grinding process may rotate a grinding container of the grinding machine holding water and contaminated soil at the speed corresponding to 75-80% of a critical rotation speed when grinding the contaminated soil through the grinding machine.

Further, the present disclosure may inject air to generate air bubbles having an average bubble diameter of 0.075 mm when injecting air into generate air bubbles in the floatation separation process.

According to the present disclosure, contaminants including heavy metals can be efficiently removed from even soil contaminated with heavy metals at a high concentration.

DETAILED DESCRIPTION

Figure 1:
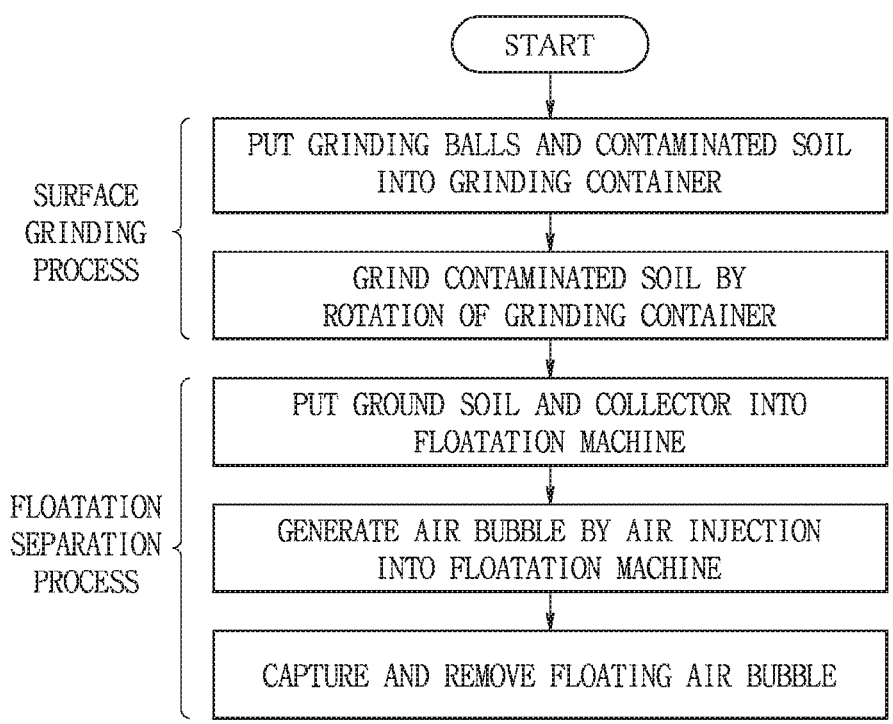
FIG. 1 is a schematic flowchart showing each step of a method for cleaning contaminated soil according to the present disclosure.

Hereinafter, preferred embodiments of the present disclosure are described with reference to the accompanying drawings. Although the present disclosure is described with reference to the embodiments shown in the drawings, this is provided by way of illustration only, and the technical aspects of the present disclosure and the key elements and their operation are not limited thereto.

A method for cleaning contaminated soil according to the present disclosure includes a contaminant removal process by surface grinding (hereinafter shortened to "surface grinding process") and a contaminant removal process by floatation separation (hereinafter shortened to "floatation separation process"). FIG. 1 is a schematic flowchart showing each step of the method for cleaning contaminated soil according to the present disclosure.

The surface grinding process mechanically separates contaminants present on the surface of contaminated soil from the soil. Even contaminants such as heavy metals which are difficult to chemically separate from the surface of the soil may be separated very effectively through the surface grinding process. The surface grinding process puts soil contaminated with heavy metals together with water into a grinding container of a grinding machine containing grinding balls, and rotates the grinding container to separate contaminants, such as, heavy metals, present on the surface of the soil from the soil by the friction of the grinding balls and the soil. The grinding machine used in the surface grinding process may include a pot mill using iron balls or ceramic balls as grinding balls. In this case, for example, about 3 kg of iron balls having a diameter of about 1 inch (66.7 g per ball, the total number of balls used: about 45) may be put into the grinding container together with water and contaminated soil.

If the pot mill rotates at a too high speed in the surface grinding process, the grinding container rotates in such a state that the grinding balls come into contact to the inner wall surfaces of the grinding container, and then the contaminant removal process does not properly work on the surface of the soil, and further, soil particles are chipped, resulting in low contaminant removal efficiency. Thus, in performing the surface grinding process, it is desirable to rotate the pot mill below a critical rotation speed to prevent a reduction in contaminant removal efficiency. To efficiently grind the surface of soil particles, the present disclosure may determine the critical rotation speed of the pot mill, and then determine an optimum rotation speed of the pot mill while changing the rotation speed of the pot mill within the range below the critical rotation speed.

After rotating the pot mill at the rotation speed corresponding respectively to 50%, 75%, and 100% of the critical rotation speed for the same sample, the heavy metal concentration is measured for each contaminated soil in ground state, and the rotation speed of the pot mill when the highest heavy metal concentration is measured may be determined as an "optimum rotation speed".

The present disclosure separates the contaminants from the surface of the soil through the surface grinding process as described above, and floats the separated contaminants on the water using a collector and a foaming agent and removes them. A process which floats the separated contaminants on the water using a collector and a foaming agent and removes them is referred to as a "floatation separation process". As the soil having undergone the surface grinding process contains water and is in a slurry state, the present disclosure puts the mixture of water and contaminated soil which becomes a slurry state through the surface grinding process into a floatation machine, and continuously injects air into the floatation machine to generate air bubbles. When generating and floating air bubbles in the floatation machine, the contaminants separated from the soil is trapped in the air bubbles and floats on the water. When the air bubbles floating on the water are removed, the contaminants separated from the soil, namely, heavy metals are removed together with the air bubbles and the contaminated soil is thereby cleaned. That is, in the floatation separation process, the contaminants separated from soil particles after surface grinding are allowed to float on the water using a collector and a foaming agent to remove the contaminants.

In performing the floatation separation process, a collector may be used to selectively attach the contaminants to the air bubbles, and a foaming agent may be used to float the generated bubbles on the water without chipping of the bubbles, and the contaminant removal efficiency is further improved by the use of the collector and the foaming agent.

In the present disclosure, the collector may include a surfactant, for example, potassium amyl xanthate (PAX) or sodium dodecyl sulfate (SDS). The surfactant is used in an aqueous solution below a critical micelle concentration. That is, after the collector is added to the mixture of water and contaminated soil having undergone the surface grinding process, air is injected to generate air bubbles. The foaming agent may include pine oil.

Meanwhile, in performing the floatation separation process using the floatation machine, an amount of air to be injected into the floatation machine is determined based on a particle size of the surface ground soil, to adjust a bubble diameter. If the bubble diameter of air bubbles generated in the floatation machine by air injection is not proper, not only contaminants but also ordinary soil floats on the water in the air bubbles, so undesirably, the cleaning efficiency is reduced. Thus, the present disclosure injects a reduced amount of air so that the bubble diameter of air bubbles generated by air injection is smaller as the particle size of soil is smaller, and in the contrary case, the present disclosure increases the amount of air to increase the bubble diameter.

The following is a description of specific experimental examples in which contaminants such as heavy metals are removed from contaminated soil using the method for cleaning contaminated soil according to the present disclosure.

<Experimental Example>

(1) Contaminated Soil Used in the Experiment

In this experiment, soil collected from the field near Janghang smelter was separated into sandy soil and clay soil, and sandy soil was used as contaminated soil in the experiment. Using standard sieves, soil was separated into sandy soil and clay soil. Specifically, soil of 0.075 mm or less in size was classified into clay soil (fine soil), and soil larger than 0.075 mm in size was classified into sandy soil.

As a result of analyzing the heavy metal content in the test contaminated soil by a known soil contamination process testing method, the arsenic content was 241 mg/kg.

(2) Experimental Elements and Experimental Method

In the experiment with the method for cleaning contaminated soil according to the present disclosure, a known pot mill having capacity of 4 L was used to perform a surface grinding process. A critical rotation speed was determined through an empirical equation using an inner diameter of the pot mill used in the experiment, and the experiment was each carried out at the rotation speed of the pot mill corresponding respectively to 50%, 75%, and 100% of the critical rotation speed to determine optimum efficiency in surface grinding. In the experiment, tap water was used, and a ratio of contaminated soil and water was 1:2.5 on the weight basis.

The specific experimental conditions for the surface grinding process according to the present disclosure were summarized in Table 1 as below.

TABLE 1

| Number of test sample | Rotation speed of grinding machine (rpm) | Ratio of soil:water (weight ratio) | Grinding time (min) |
|---|---|---|---|
| Sample 1-1 | 10 | 1:2.5 | 1 |
| Sample 1-2 | | | 3 |
| Sample 1-3 | | | 5 |
| Sample 1-4 | | | 30 |
| Sample 1-5 | | | 60 |
| Sample 1-6 | | | 120 |
| Sample 2-1 | 15 | | 1 |
| Sample 2-2 | | | 3 |
| Sample 2-3 | | | 5 |
| Sample 2-4 | | | 30 |
| Sample 2-5 | | | 60 |
| Sample 2-6 | | | 120 |
| Sample 3-1 | 20 | | 1 |
| Sample 3-2 | | | 3 |
| Sample 3-3 | | | 5 |
| Sample 3-4 | | | 30 |
| Sample 3-5 | | | 60 |
| Sample 3-6 | | | 120 |

After the surface grinding process was performed, the floatation separation process was performed. Table 2 shows a summary of specific experimental conditions for the floatation separation process according to the present disclosure, and for each sample of the above Table 1, the floatation separation process was performed under the conditions of "Embodiment 1" and "Embodiment 2" summarized in the following Table 2.

In performing the floatation separation process, tap water was added to the soil in a slurry state which was prepared in the pot mill of the surface grinding process and put into a floatation machine. In this instance, a ratio of the contaminated soil in a slurry state and the newly added tap water was about 1:3 in weight ratio. In the floatation separation process, to attach contaminants to bubbles, surfactants, for example, potassium amyl xanthate (PAX) and sodium dodecyl sulfate (SDS) were introduced as a collector, and the performance of the surfactants as a collector was compared. Each of the surfactants was introduced at the concentration of 10 g/ton, 20 g/ton, and 30 g/ton, and involved in the experiment. To float the generated air bubbles on the water surface without chipping, 0.04 mL of pine oil was used as a foaming agent.

To determine the floating efficiency based on the bubble diameter of the generated bubbles, the experiment was carried out with an average bubble diameter adjusted respectively to 0.05 mm, 0.075 mm, and 0.1 mm, and the bubble diameter was measured using a bubble diameter measuring instrument. The floatation separation was continuously performed for 20 minutes and air bubbles being generated were continuously collected at an interval of 5 minutes and the weight and concentration was measured for each air bubble. For reference, in the following Table 2, the collector concentration in "g/ton" represents the collector mass per 1 ton of soil.

TABLE 2

| Number of embodiment of floatation separation | Ratio of soil:water (weight ratio) | Foaming agent | Collector | Collector concentration (g/ton) | Bubble diameter (mm) | Floatation time |
|---|---|---|---|---|---|---|
| Embodiment 1 | 1:3 | Pine-oil | PAX | 10 | 0.05 | 0-20 min |
|  |  |  |  | 20 | 0.075 |  |
|  |  |  |  | 30 | 0.1 |  |
| Embodiment 2 |  |  | SDS | 10 | 0.05 |  |
|  |  |  |  | 20 | 0.075 |  |
|  |  |  |  | 30 | 0.1 |  |

The soil having undergone the surface grinding process according to the present disclosure, the air bubbles generated in the floatation machine of the floatation separation process, and the soil remaining in the floatation machine were sifted in a standard sieve, and a heavy metal concentration analysis was each conducted by a known soil contamination process testing method.

(3) Experimental Results

Figure 2:
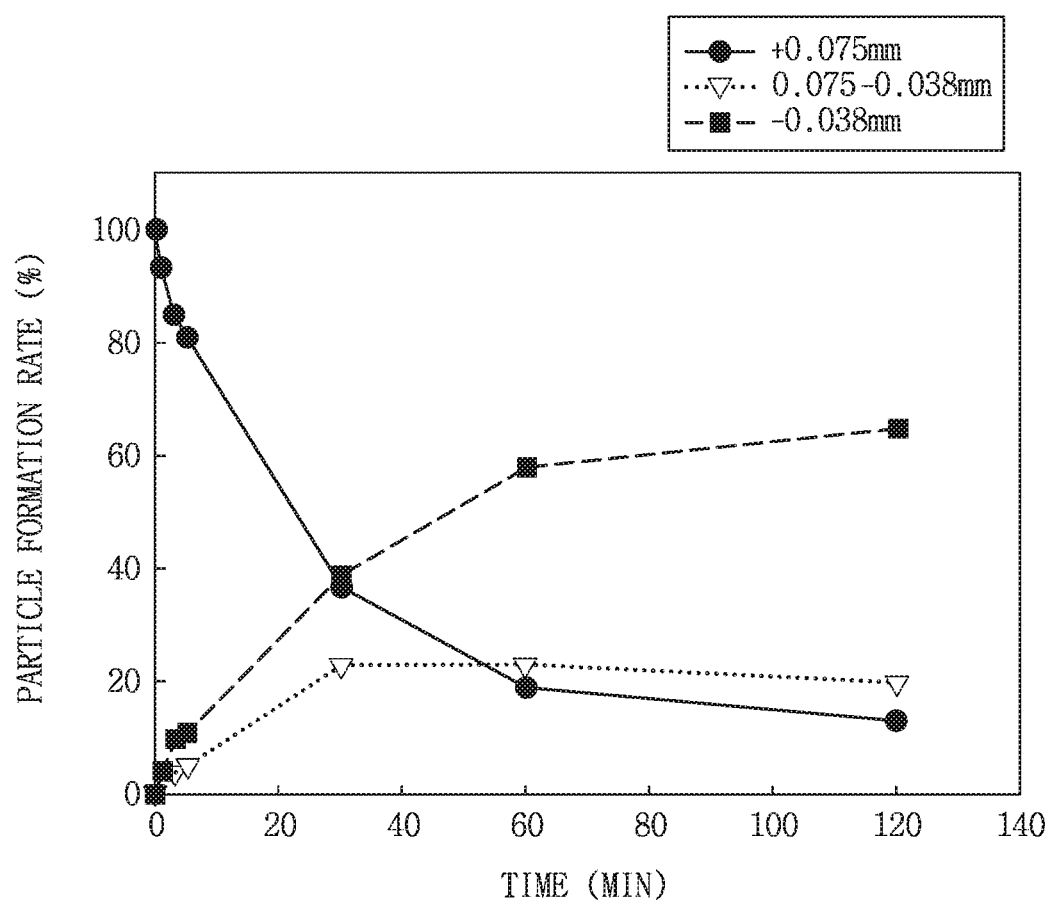
FIGS. 2 through 4 are graphs each showing measurement results of a particle formation rate over time during which a surface grinding process is performed at varying rotation speed of a grinding machine in the cleaning of contaminated soil.
Figure 3:
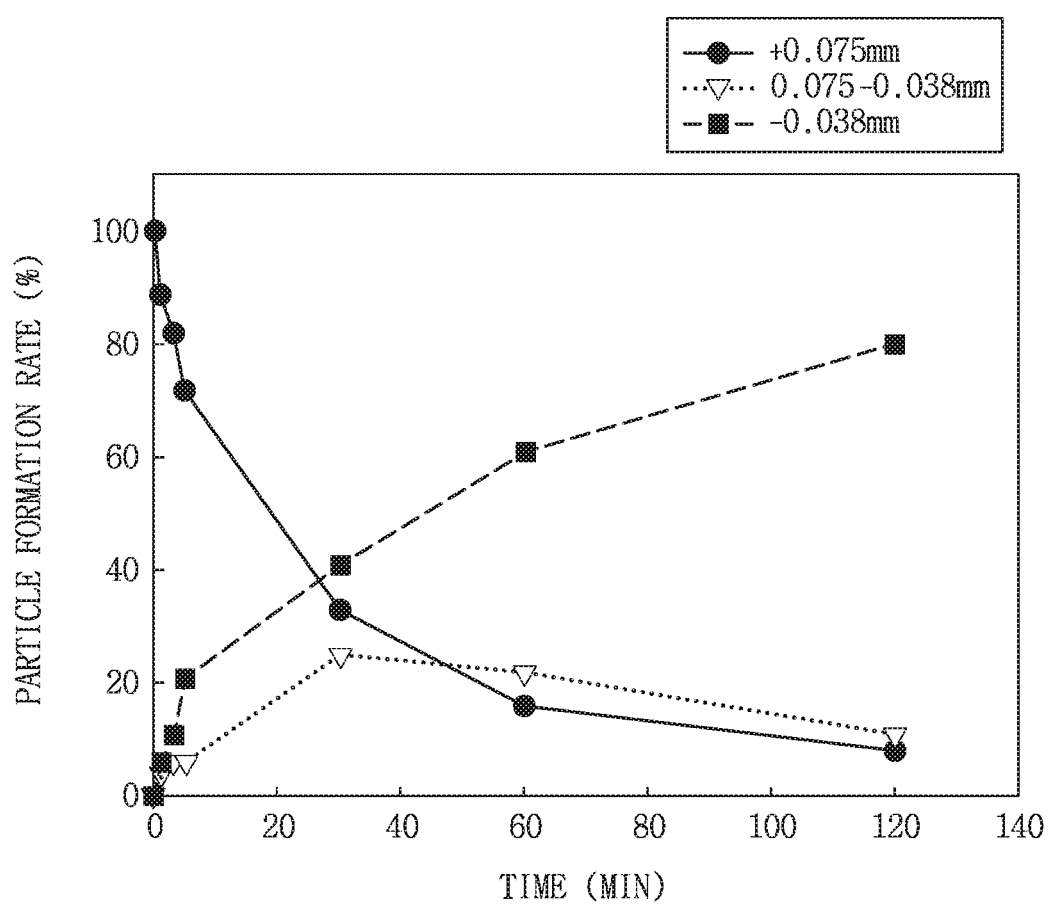
Figure 4:
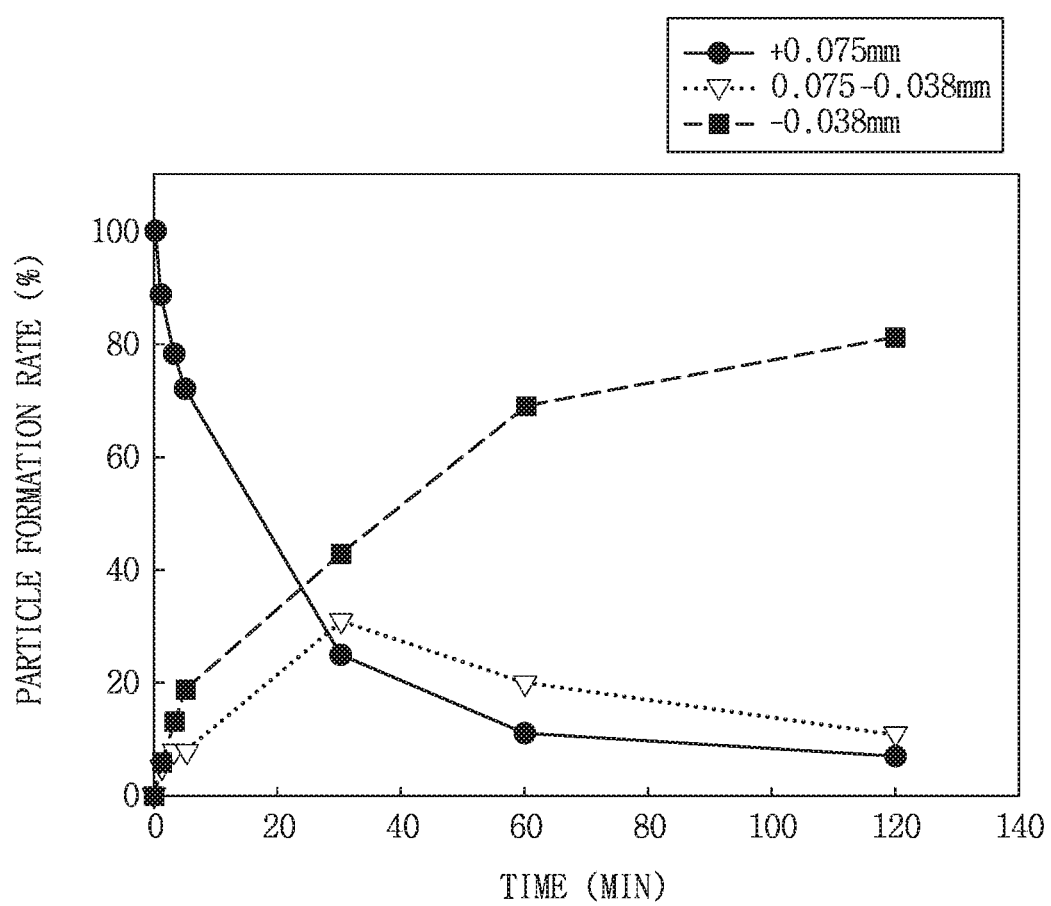

FIGS. 2 through 4 are graphs each showing measurement results of a particle formation rate over time during which the surface grinding process is performed at varying rotation speed of the grinding machine. FIG. 2 shows the case where the speed of the grinding machine is 10 rpm, FIG. 3 shows the case where the speed of the grinding machine is 15 rpm, and FIG. 4 shows the case where the speed of the grinding machine is 20 rpm. In the legend for each of the graphs shown in FIGS. 2 through 4, numerical values indicated in mm represent a soil particle size.

As can be seen from FIGS. 2 through 4, in the case of soil particles larger than 0.075 mm in size, the longer the surface grinding process was performed, the lower the particle formation rate was. However, in the case where soil having a particle size smaller than or equal to 0.075 mm, the particle formation rate had a tendency to gradually increase. This result reveals analysis that the surface of the soil particles was gradually ground by the grinding balls.

Figure 5:
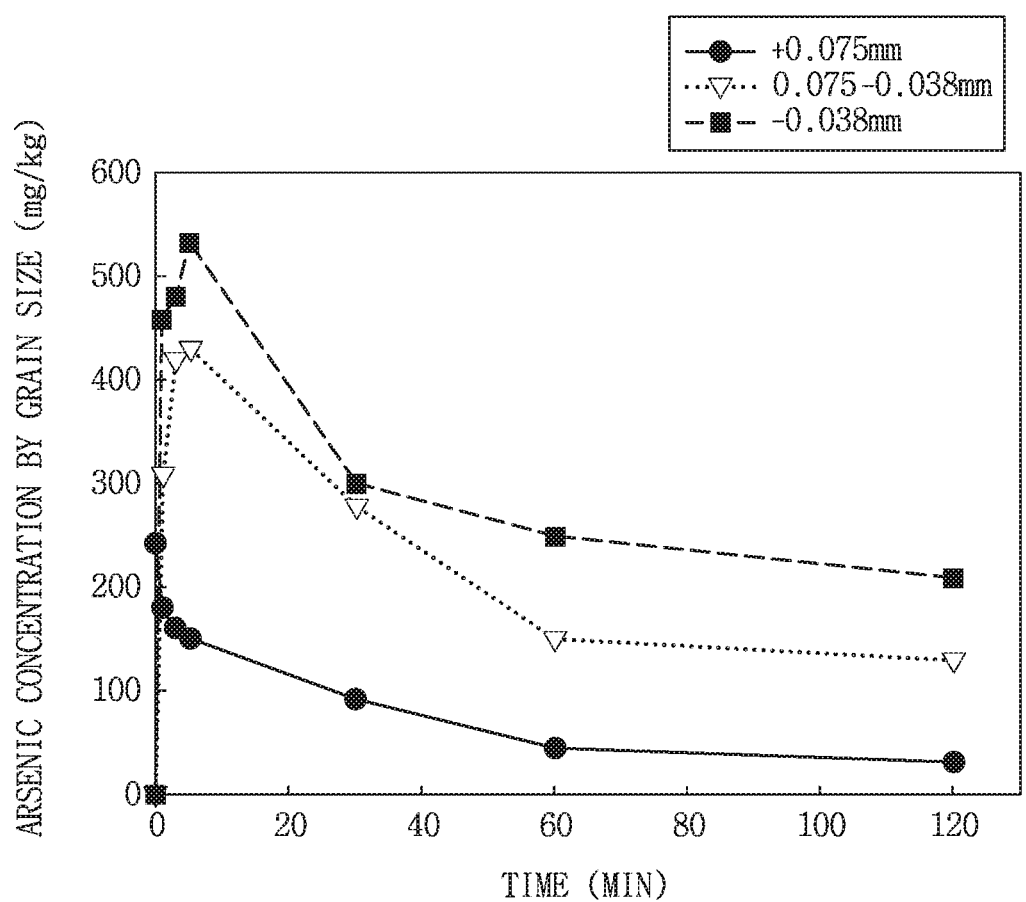
FIGS. 5 through 7 are graphs each showing the heavy metal concentration (arsenic concentration) by soil particle size as a function of a rotation speed of a grinding machine used in a surface grinding process in the cleaning of contaminated soil.
Figure 6:
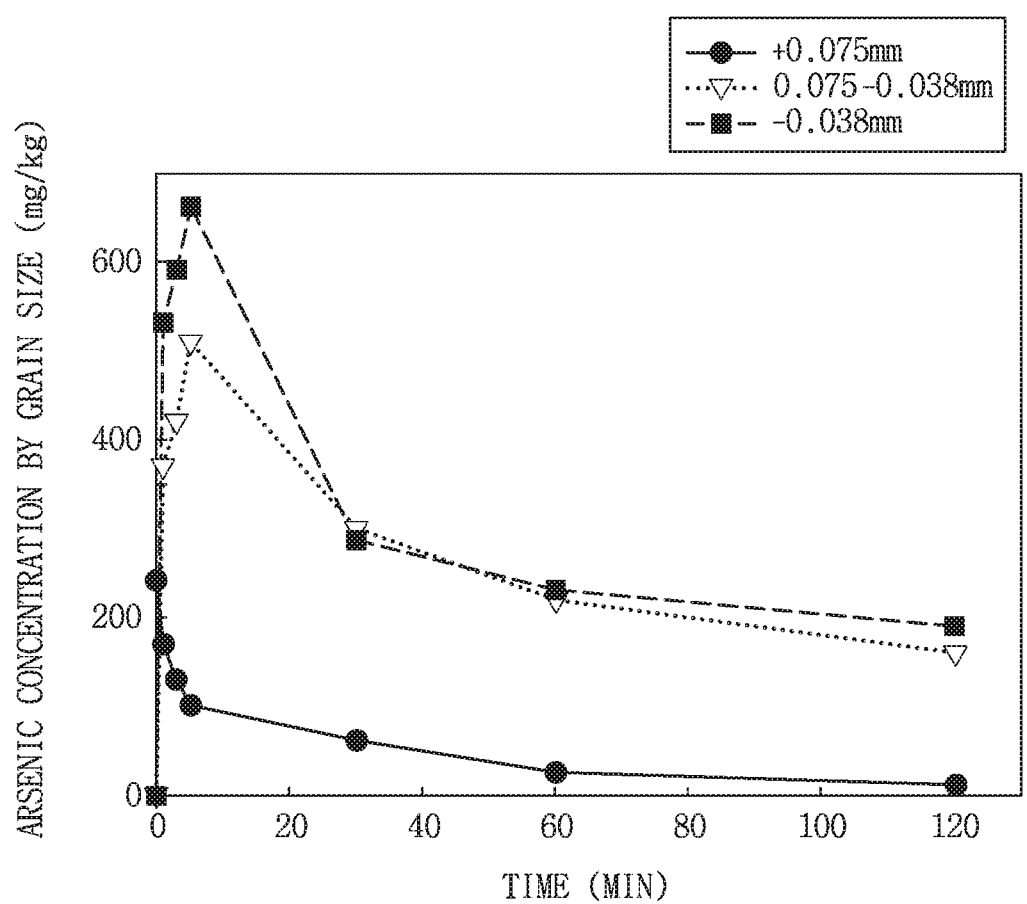
Figure 7:
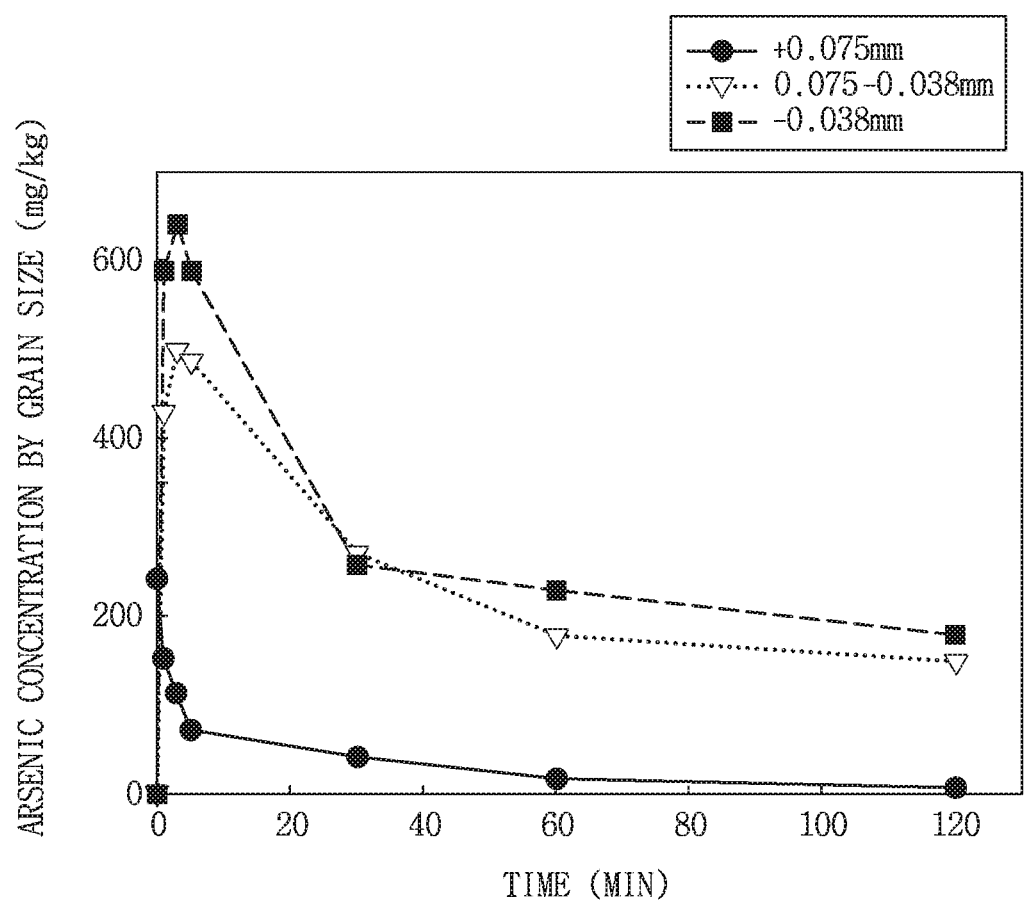

FIGS. 5 through 7 are graphs each showing the heavy metal concentration (arsenic concentration) by soil particle size as a function of the rotation speed of the grinding machine used in the surface grinding process. FIG. 5 shows the case where the speed of the grinding machine is 10 rpm, FIG. 6 shows the case where the speed of the grinding machine is 15 rpm, and FIG. 7 shows the case where the speed of the grinding machine is 20 rpm. In the legend for each of the graphs shown in FIGS. 5 through 7, numerical values indicated in mm represent a soil particle size. As can be seen from FIGS. 5 through 7, when the grinding machine operated at the rotation speed corresponding to 50% and 75% of the critical rotation speed, soil having a particle size smaller than or equal to 0.075 mm had a gradual increase in heavy metal concentration over time until 5 minutes past the operation start time of the grinding machine. However, after 5 minutes have passed, the heavy metal concentration was gradually reduced. Most of heavy metals are present on the surface of the soil, and at the initial stage of the surface grinding process, the heavy metal concentration increases due to surface grinding by the grinding balls, but when about 5 minutes have passed after grinding, the surface of soil particles containing no heavy metals is also continuously ground, so the measured heavy metal concentration is gradually reduced, and presumably, the result such as the above is measured.

Meanwhile, operation of the grinding machine at the rotation speed corresponding to 100% of the critical rotation speed did not show a big difference from operation at 75% of the critical rotation speed. Thus, in performing the surface grinding process to clean soil contaminated with a high concentration of heavy metals, when considering consumption of energy required to operate the grinding machine, it is desirable to operate the grinding machine at the rotation speed which is within 75-80% of the critical rotation speed.

Figure 8:
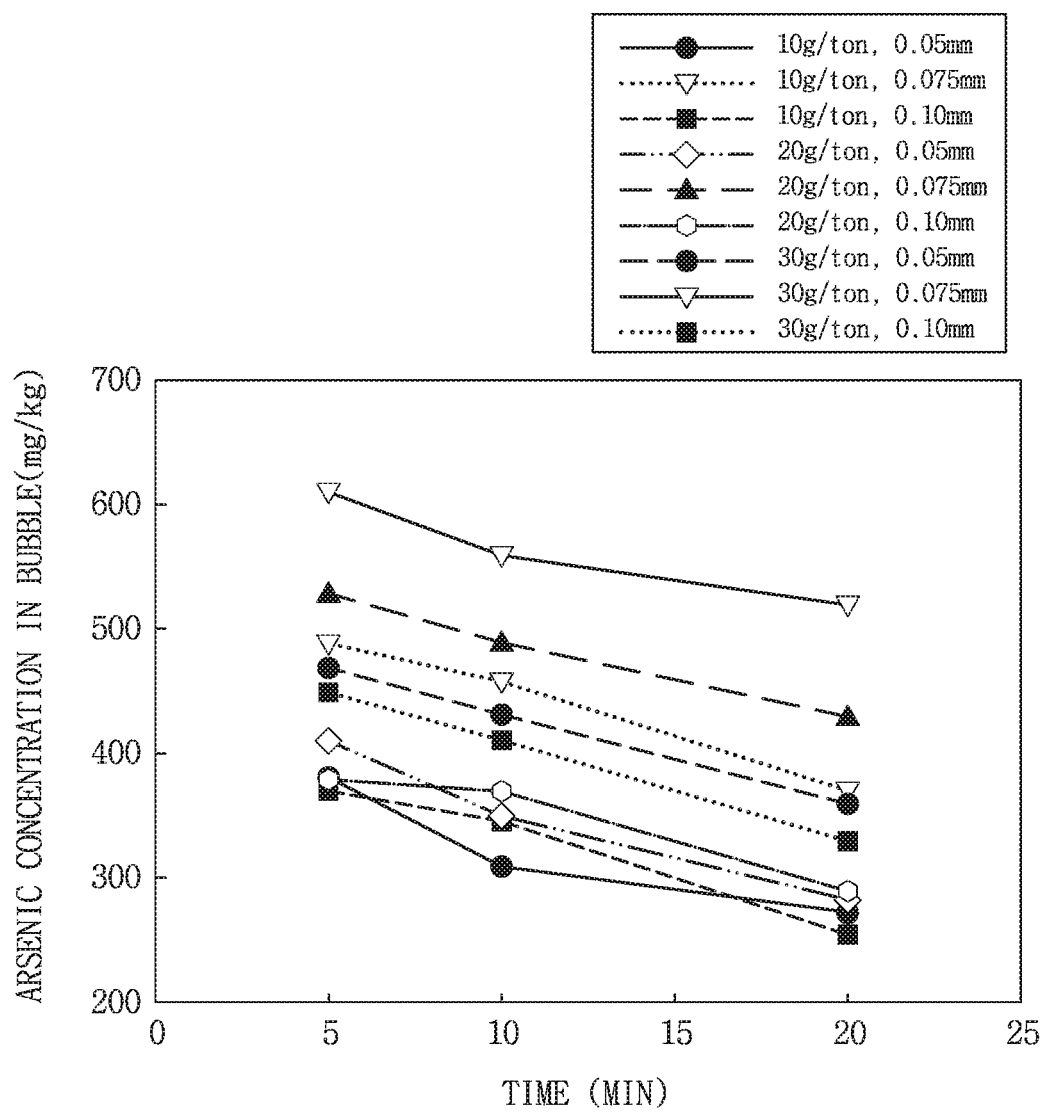
FIG. 8 is a graph of measurement results of the heavy metal concentration of air bubbles generated in a floatation separation process over time at varying collector concentrations and bubble diameters when cleaning contaminated soil using potassium amyl xanthate as a collector.
Figure 9:
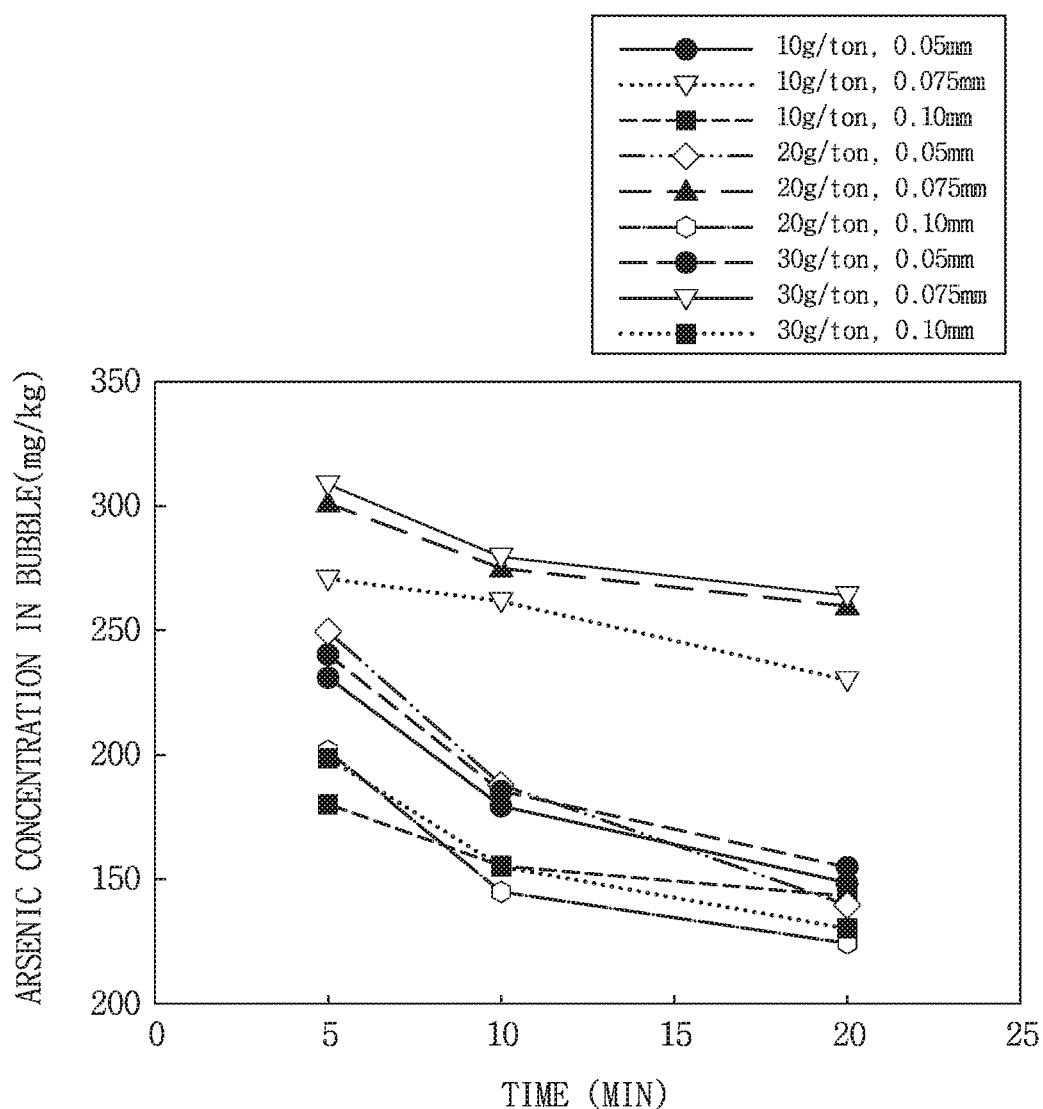
FIG. 9 is a graph of measurement results of the heavy metal concentration in air bubbles generated in a floatation separation process over time at varying collector concentrations and bubble diameters when cleaning contaminated soil using sodium dodecyl sulfate as a collector.

FIGS. 8 and 9 are graphs of measurement results of the heavy metal concentration in air bubbles generated in the floatation separation process over time at varying collector concentrations and bubble diameters when PAX was used as the collector (FIG. 8) and when SDS was used as a collector (FIG. 9), respectively. In the legend for each of the graphs shown in FIGS. 8 and 9, numerical values indicated in g/ton represent a collector concentration, and numerical values indicated in mm represent a bubble diameter.

As can be seen from FIGS. 8 and 9, the heavy metal concentration in air bubbles when PAX was used as a collector was higher than the heavy metal concentration in air bubbles when SDS was used as a collector. Presumably, this result comes from that PAX has higher selectivity for arsenic than SDS. As the collector concentration increases up to 30 g/ton, both PAX and SDS tended to increase the heavy metal concentration in the generated air bubbles. However, because PAX has very high capability of capturing heavy metals, when an excessively high concentration of PAX is used, even soil not contaminated with heavy metals tends to float. Thus, PAX used as a collector is preferably used in an amount of 30 g or less per 1 ton of soil, i.e., 30 g/ton or less. As described above, the present disclosure may greatly improve the contaminant capture efficiency by air bubbles and achieve more efficient contaminant removal by using PAX and SDS as a collector singly or both in the floatation separation process.

Meanwhile, as the floatation time increases, the heavy metal concentration in air bubbles has a gradual decreasing tendency, and presumably this result comes from that a large amount of soil particles containing arsenic was removed by floatation at the initial stage of floatation. According to the result of testing the floatation efficiency based on the bubble diameter of the generated bubbles, the heavy metal concentration in the generated air bubbles had an increasing tendency as the bubble diameter increases, but when the bubble diameter is larger than or equal to 0.075 mm, the heavy metal concentration in air bubbles had a decreasing tendency. Through the surface grinding process, most of heavy metals are present on the soil particles smaller than or equal to 0.075 mm. Thus, as with the bubble diameter increases, soil larger than 0.075 mm in size containing no heavy metals tends to float together with air bubbles, so it is most efficient when the bubble diameter is 0.075 mm on average.

It can be seen that when soil contaminated at an initial arsenic concentration of 241 mg/kg undergoes the method for cleaning contaminated soil according to the present disclosure, that is, the surface grinding process and the floatation separation process under the optimal conditions proposed in the present disclosure, the arsenic concentration is reduced by about 60%.

What is claimed is:

1. A method for cleaning contaminated soil, comprising:
    obtaining contaminated soil from ground;
    mixing the contaminated soil with water into a grinding container of a grinding machine holding grinding balls;
    rotating the grinding container to separate contaminants from surfaces of one or more individual soil particles of the contaminated soil by the friction between the grinding balls and the one or more soil particles of the contaminated soil; and
    adding potassium amyl xanthate or sodium dodecyl sulfate as a collector to the mixture of water and contaminated soil; and
    injecting air into the mixture of water and contaminated soil in the grinding container to generate the air bubbles such that the air bubbles have an average bubble diameter of 0.075 mm.

2. The method of claim 1, further comprising putting the mixture of water and contaminated soil into a floatation machine after rotating the grinding container and before adding the potassium amyl xanthate or sodium dodecyl sulfate.

* * * * *